United States Patent Office 3,574,162
Patented Apr. 6, 1971

3,574,162
STABILISING MALEIC ANHYDRIDE COPOLYMERS
Dennis Arthur Barr, Welwyn, England, assignor to Imperial Chemical Industries Limited, London, England
No Drawing. Continuation-in-part of application Ser. No. 368,330, May 18, 1964. This application Sept. 18, 1968, Ser. No. 760,662
Int. Cl. C08f 45/58
U.S. Cl. 260—45.7  6 Claims

ABSTRACT OF THE DISCLOSURE

Copolymers of maleic anhydride and 2-substituted propenes as claimed in U.S. Pats. 3,297,654 and 3,318,851 are heat-stabilised during moulding processes by the incorporation of non-volatile organic sulphonic acids or their esters, organic base salts, anhydrides and acid halides which will decompose to yield the organic sulphonic acid when heated during fabrication into shaped articles.

---

This application is a continuation-in-part application of United States application Ser. No. 368,330, filed May 18, 1964, now abandoned.

The present invention relates to stabilising copolymers.

Maleic anhydride may be copolymerised with one or more olefins and the polymers produced are believed to contain maleic anhydride residues as alternate units of the polymer chain. When the comonomer is ethylene or propylene, the copolymers are watersensitive but when the comonomer is an olefin having at least four carbon atoms, the copolymer is in most cases not sensitive to water.

When the comonomer is a vinylidene hydrocarbon of at least five carbon atoms or is ethylene or propylene, the copolymers can have a combination of melt viscosity and reduced viscosity such that they can be shaped by the methods of the plastics industry to strong articles; for example as discussed in respect of the copolymers of the higher olefins in U.S. Pat. 3,318,851, which describes mouldable copolymers of 25% to 50% molar of maleic anhydride, at least 25% molar of an alkene of the structure

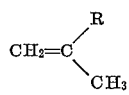

ture where R is a straight chain alkyl group containing from 2 to 6 carbon atoms, and up to 25% molar of at least one other monoethylenically unsaturated compound.

When the comoner is isobutylene, the only $C_4$ olefin which copolymerises readily with maleic anhydride, the copolymers with reduced viscosities sufficiently high for mouldings of them to be strong, have such high melt viscosities that moulding them is difficult. In fact, they decompose with the evolution of carbon dioxide at the temperatures most suitable for moulding them. U.S. Pat. 3,297,654 is concerned with methods for improving these maleic anhydride/isobutylene copolymers and in particular reducing this high melt viscosity defect, the principal condition being that of including specified quantities of one or more further monomers in the copolymers, such further monomers being particularly other olefins, wherein the claimed composition is an injection mouldable copolymer of maelic anhydride, isobutylene and about 1% molar to about 25% molar of a third comoner selected from the group consisting of (i) alkenes having a chain of not more than six carbon atoms and having the structure

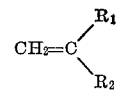

where $R_1$ and $R_2$ are both alkyl groups, at least one of which contains more than one carbon atom, (ii) cyclic anhydrides, inmides and N-substituted imides of ethylenically unsaturated dicarboxylic acids containing not more than 6 carbon atoms, other then maelic anhydride, (iii) dialkyl fumarates of the structure

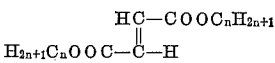

where $n$ is one or four, (iv) ethyl acrylate and (v) propylene; said copolymer containing at least 25% molar of maleic anhydride, at least 25% molar of isobutylene and not more than 6% molar of propylene, and wherein the melt viscosity of the copolymer is below $10^5$ poises, measured at 250° C. under a constant shear stress of $10^7$ dynes/cm.$^2$, whereby the copolymer may be fabricated at temperatures as low as 230° C. or less on standard equipment.

All these maleic anhydride/olefin copolymers are subject to thermal decomposition with the liberation of carbon dioxide and this is a limitation to a greater or lesser degree upon the ease with which they can be fabricated into articles by the methods of the plastics industry or upon the properties of the articles so made. It is an object of this invention to reduce this thermal decomposition.

We now provide compositions of maleic anhydride/ olefin copolymers as described and claimed in U.S. patent specifications 3,297,654 and 3,318,851 which comprise as stabiliser therefor from 0.01 to 5% by weight of the polymer of one or more non-volatile amine and hydroxyl free organic sulphonic acids or one or more of their esters, organic base salts, anhydrides and acid halides which will decompose to yield non-volatile amine and hydroxyl free organic sulphonic acids (e.g. by hydrolysis or thermal decomposition) during fabrication of the composition into a shaped article.

Compounds which decompose to yield the acid and which may be used in our compositions are those for which the decomposition reaction can occur during the fabrication of the composition into a shaped article. Because of the variety of conditions used in processes for shaping our specific copolymer compositions, no particular figure for a maximum acceptable decomposition temperature can be assigned. However, for most purposes it is preferred to use compounds which decompose appreciably at or below about 240° C.

By "non-volatile" we mean that the stabiliser is sufficiently involatile at the temperature at which the composition is shaped for a stabilising amount of it to remain in the composition during shaping. In most cases, fabrication temperatures for our specified copolymers lie in the range of from about 240 to 270° C.

While a definite limit to the maximum acceptable volatility of the stabilising compounds cannot readily be assigned because of the variety of conditions used in processes for shaping our specified maleic anhydride copolymer compositions, it may be said as a general guide that the compound is satisfactory if the amount of gas evolved per gram of a composition comprising 100 parts of the maleic anhydride copolymer and 0.5 part of the said compound after 30 minutes at 270° C. and an absolute pressure of between $10^{-3}$ and $10^{-4}$ mm. of Hg is not more than one half that evolved from the unmodified copolymer under the same conditions. Where it is more convenient to measure the evolution after one hour, the amount should be not more than three-quarters that evolved from the unmodified copolymer under the same conditions. Suitably the test is carried out on samples weighing about 1 gm. and in the form of pellets 0.1 inch thick. A convenient testing apparatus comprises an aluminium block heated to 270° C. and bearing a glass tube fitting vertically into the block and attached to a liquid nitrogen trap. The pellet under test is placed in the upper part of the tube in such a way that it can be dislodged readily without breaking the gas-tight seal. The trap is then immersed in liquid nitrogen and the apparatus is evacuated using a mercury vapour pump in conjunction with a rotary oil type backing pump until there is no noticeable discharge using a Tesla coil. The pressure is then between $10^{-3}$ and $10^{-4}$ mm. of Hg absolute. This pressure is held for sufficient time to ensure that stable conditions are attained (generally at least 30 minutes) and then the pumps are isolated from the apparatus and the pellet is dislodged into the heated part of the tube. The time during which evolution of gas is measured is calculated from this point. The gas evolved is condensed in the liquid nitrogen trap in order to keep the pressure in the apparatus low. When it is desired to measure the gas evolved, the cold trap is isolated from the apparatus and the condensed gas allowed to warm to room temperature. For convenience, the volumes measured may be converted to NTP.

It will be appreciated that for the more volatile compounds, the amount remaining in the composition under specified conditions pertaining to a fabrication procedure will be less and a greater initial amount of the compound will be rquired in order to ensure adequate freedom from degradation under the conditions of fabrication. However, increase in the amount of stabiliser in the composition may adversely affect the properties which make it attractive as a moulding material, for instance its strength and dimensional stability at elevated temperatures. Thus, for this and economic reasons alone, it is preferred to use the compounds with lower rates of volatilisation.

We prefer those compounds which when added in an amount of 0.5 part per 100 parts of copolymer reduce the amount of gas evolved per gram of composition after 30 minutes under the conditions described above to about one-eighth or less of that evolved from a sample of the unmodified polymer under the same conditions. The choice of compound may also be influenced by its effect on other properties of the polymeric composition; for instance, colour and water-sensitivity, and it may be desirable in some circumstances to sacrifice a little stability in order to obtain compositions of good colour and/or good water-sensitivity.

Examples of compounds which decompose to yield the acids are those esters, salts of organic bases, anhydrides and acid halides, which dissociate by hydrolysis or thermal decomposition. The esters are generally very suitable since they are often prepared pure more readily than the corresponding acid. However, in some cases it may be preferred not to use esters of low molecular weight alcohols because of the danger that they may distill in appreciable quantities from the composition at a temperature lower than that at which useful thermal dissociation occurs. Cyclic esters such as sultones are included within the term "esters." The salts are those of the acid with organic bases and it is preferred to use those which are not able to form the corresponding acid amides by loss of a molecule of water. Acid halides are very suitable when they are found in the form of colourless powders which may be readily incorporated in the polymer. However, their use is limited because they tend to yield hydrogen halides, the evolution of which during fabrication procedures may create a toxicity hazard.

Suitable acids which may be used in our compositions are:

(1) The aromatic sulphonic acids derived from wholly aromatic compounds (e.g. benzene, naphthalene, anthracene and diphenyl), from heterocyclic aromatic compounds wherein one or more of the aromatically bound hydrogen atoms are replaced by other atoms or groups, for example halogen atoms or alkyl, cycloalkyl and aralkyl groups or those having the structure —OH, —NH$_2$, —NHR, —NRR', —OR, —COOH, —COOR, —CONH$_2$, —CONHR, —CONRR', —NHCOR and —MOR where R and R' are monovalent hydrocarbon groups, for instance alkyl, cycloalkyl, aryl, alkaryl or aralkyl or their halogenated derivatives and M is a divalent hydrocarbon radical or its halogenated derivative e.g. alkylene such as polymethylene. Examples of R and R' are methyl, ethyl, propyl, butyl, isobutyl, hexyl, octyl, octadecyl, eicosyl, triacontyl, cyclohexyl, cyclo-octyl, phenyl, α-naphthyl, β-naphthyl, diphenyl, tolyl, xylyl, p-ethylphenyl, benzyl, chloromethyl, bromomethyl and p-chlorophenyl. Two aromatically bound hydrogen atoms may be replaced, if desired, by a divalent group to yield, for example, indene or coumarone. Examples of such acids are α- and β-naphthalene sulphonic, benzene sulphonic, p-diphenyl sulphonic, p-toluene sulphonic, nonyl benzene sulphonic, benzene disulphonic, naphthalene disulphonic, naphthalene trisulphonic acids, nitrobenzene sulphonic and nitroanphthalene sulphonic acids, pyridine sulphonic acids, chlorobenzene sulphonic acids and diphenyl ether-p-p'-disulphonic acid.

(2) The aliphatic sulphonic acids: that is, those in which the sulphonic acid group is directly attached to an aliphatic carbon atom. The aliphatic sulphonic acids may be derived from straight-chain or branch-chain or cyclic paraffins or from an aliphatic hydrocarbon containing aromatic substitution. One or more of the hydrogen atoms attached to the aliphatic or aromatic carbon atoms may be replaced by other atoms or groups, for example halogen atoms or groups having the structure —OH, —NH$_2$, —NHR, —NRR', —OR, —COOH, —COOR, —CONH$_2$, —CONHR, —CONRR', —NHCOR and —MOR, where M, R, and R' have the possibilities itemised above. The aliphatic sulphonic acids derived from unsubstituted hydrocarbons are preferred because of their ready availability and their lack of reactivity with the polymer chains. Examples are methyl sulphonic acid, lauryl sulphonic acid, octadecyl sulphonic acid and cyclohexane sulphonic acid.

We prefer not to use sulphonic acids having substituents which may react with the polymer chains. Examples of such substituents are hydroxyl and amine groups. The aromatic sulphonic acids give generally better results.

Any non-volatile, decomposable esters of the above acids may be used. Conveniently they are alkyl, e.g. methyl, ethyl, isomeric propyl, isomeric butyl, isomeric amyl, hexyl, cyclohexyl, heptyl, octyl, cyclo-octyl, lauryl, octadecyl, eicosyl, heneicosyl, docosyl, tricosyl, pentacosyl, triacontyl, pentatriacontyl or tetracontyl or aralkyl, e.g. benzyl or β-phenyl ethyl esters. Other esters which may be used are substituted alkyl (e.g. halogenated) and polyesters of polyhydric compounds such as glycols, glycerol, neopentyl alcohol, pentaerylthritol and polyalkylene oxides.

While the salts may be derived from any organic base, preferred salts are those of the acids with tertiary amines, N,N-disubstituted amides or imides since these do not form the acid amide by loss of a molecule of water. Examples of tertiary amines are trialkylamines, dialkylarylamines, alkyldiaryl amines and triarylamines. In this context, the term alkyl includes cycloalkyl and aralkyl and the term aryl includes alkaryl. Thus, the amines may be said to have the structure NRR'R" where R, R' and R" are each monovalent hydrocarbon radicals, for instance methyl, ethyl, propyl, isopropyl, isomeric butyls, isomeric amyls, hexyl, isomeric octyls, decyl, lauryl, cetyl, octadecyl, eicosyl, thriacontyl, cyclohexyl, methylcyclohexyl, phenyl, tolyl, isomeric xylyls and benzyl. Examples of tertiary amines are tridecylamine, diphenylmethylamine, phenyldimethylamine and triphenylamine. Other tertiary amines are those which contain trivalent nitrogen as part of a ring compound, e.g. pyridine. While our examples have been limited to tertiary amines wherein all three substituents are hydrocarbon groups, their substituted (e.g. halogenated) derivatives may also be used. Fully substituted diamines are also included; for instance N,N,N', N'-tetramethyl ethylenediamine. Examples of N,N-disubstituted amides are those having the structure RCONR'R" where, R, R' and R" are each monovalent hydrocarbon radicals or their substituted (e.g. halogenated) derivatives. Very suitably, R is an alkyl group and the amide is derived form a fatty acid. Examples are N,N-dimethylacetamide, N,N-diethylacetamide and N,N-dimethyl lauramide. Suitably the imides are derived from $\alpha,\beta$-dicarboxylic acids having no ethylenic unsaturation, for instance succinimide and phthalimide.

Thiouronium salts may also be used; an example is the S-benzyl thiouronium salt of $\beta$-naphthalene sulphonic acid.

Anhydrides formed by condensation of two sulphonic acids may be used and the acids may be the same or different. Furthermore, mixed anhydrides of sulphonic acids with other acids may be used where the dissociation products are not likely to have an adverse effect on the stability of the compositions incorporating them. Cyclic anhydrides of disulphonic acids may also be used.

The acid halides are most conveniently the acid chlorides and bromides since these are generally readily available.

Preferred copolymers are those described in U.S. Pats. 3,297,654 and 3,318,851 which comprise copolymers of 50 mole percent maleic anhydride, 44 to 49% isobutylene and 6 to 1% propylene; 50 mole percent maleic anhydride, 25 to 49 mole percent isobutylene and 25 to 1% of a 2-alkyl substituted propylene containing from 2 to 6 carbon atoms in the substituent chain (especially 2-methyl butene-1,2-methyl pentene-1 or 2,4,4-trimethyl pentene-1); 25 to 49 mole percent maleic anhydride, 25 to 1 mole percent of itaconic anhydride, citraconic anhydride, maleimide or an N-substituted maleimide (particularly an N-aryl maleimide such as N-phenyl maleimide or an N-substituted phenyl amleimide) and 50 mole percent of isobutylene; 25 to 49 mole percent maleic anhydride, 25 to 1 mole percent of ethyl acrylate and 50 mole percent of isobutylene; 25 to 49 mole percent maleic anhydride, 50 mole percent of isobutylene, and 25 to 1 mole percent of a diester of an $\alpha,\beta$-ethylenically unsaturated dicarboxylic acid (especially fumaric acid) and an alcohol containing 1 to 4 carbon atoms; copolymers of maleic anhydride and 2-alkyl substituted propylenes in which the alkyl group has from 2 to 6 carbon atoms, that is 2-methyl butene-1, 2-methyl pentene-1, 2-methyl hexene-1, 2-methyl heptene-1 and 2-methyl octene-1; and tercopolymers comprising at least 25 mole percent maleic anhydride, at least 25 mole percent of said 2-alkyl substituted propylene and at least 1% of a third monomer polymerisable with the other two, wherein the preferred comonomers are alkenes having a chain of not more than 6 carbon atoms and other than that selected as the second monomer, esters of acrylic acids (e.g. methyl methacrylate), dialkyl esters of ethylenically unsaturated dicarboxylic acids (e.g. dialkyl fumarate or dialkyl maleate) and cyclic derivatives of $\alpha$, $\beta$-ethylenically unsaturated dicarboxylic acids (e.g. N-aryl maleimides).

The stabiliser may be added to the polymer at the polymerisation stage, but the washing of the polymer after polymerisation may cause its partial removal. Alternatively, it may be blended into the polymer after polymerisation and after any washing step which may follow polymerisation. It may also be added, rather less effectively, by washing the polymer with a solution of the stabiliser.

We prefer to dry-blend the stabiliser with the polymer. This is effected conveniently by tumbling the polymer with the stabiliser or by milling the ingredients, for example in a ball mill. In order to obtain a more homogeneous product, it is often desirable to follow the dry-blending step by extruding the blend in substantially molten form in a screw extruder. The cooled extrudate may then be comminuted, if desired, to provide granules of a suitable size for use in further fabrication steps.

Where the polymer is in the form of a fine powder, it may be preferable to incorporate the stabiliser in the presence of a solvent for the latter which does not dissolve the polymer (for example, water or diethyl ether). In this process the resulting slurry is thoroughly mixed and the solvent is removed under conditions such that there is no measurable loss of the stabiliser by volatilisation. In general, we prefer to use a solvent which is readily removed from the polymer, for instance a volatile liquid such as diethyl ether or petrol.

Suitable proportions of stabiliser are from 0.01 to 5%, preferably from 0.1 to 1%, by weight of the composition. It is preferred to use the minimum amount for satisfactory stabilisation since large amounts of stabiliser may affect adversely the properties of the composition such as its strength at elevated temperatures, its colour and its water-sensitivity.

Before shaping, the compositions may be mixed with any of the usual additives such as plasticisers, other heat stabilisers and light stabilisers, mould release agents, lubricants and fillers such as talc, clay, carbon black, powdered metals, mica, asbestos and glass fibre. The copolymers may also be blended with other polymeric materials, natural or synthetic. They may, if desired, after stabilisation be compressed into pellets or extruded and chopped to give granules. They may also be milled to give sheet which may be cut to give granules. When produced in these forms, the compositions are particularly suitable for use in shaping processes to give finished articles.

Our compositions show markedly increased stability over those which do not include one of our specified stabilisers and are therefore most attractive materials for use in those fabrications processes in the plastics art which require the polymer to be maintained at elevated temperatures, and often in molten form, during processing.

Examples of such processes are extrusion by ram or screw-operated machines and moulding by injection, compression or transfer techniques. In general, such processes require temperatures of about 240° C. to 270° C. although somewhat lower or higher temperatures may be required in particular cases. In general, however, it is preferred to avoid the use of temperatures in excess of 260° C. except for very short periods of time. The choice of temperature depends upon the process and the composition of the copolymer. The times required for processing depend upon the choice of process, the composition of the polymer and the temperature, but in general, times of at least two minutes are required.

The invention is illustrated by the following examples.

EXAMPLE 1

In this, as in the other examples, the dried polymer or the polymer/stabiliser composition was made into pellets of weight about 1.0 gm. and thickness $\frac{1}{10}''$ for testing, and the testing apparatus comprised an aluminum block heated electrically at temperatures up to 270±2° C. (270±0.5° C. in Examples 2 and 3), and bearing a glass tube fitting vertically into the block and attached to a liquid nitrogen trap to condense the $CO_2$ evolved.

The tests were carried out as follows:

A pellet of the polymer or composition was placed in the upper part of the vertical tube in such a way that it could be readily dislodged without breaking the gas-tight seal, the trap was immersed in liquid nitrogen, and the apparatus was evacuated using a mercury vapour pump in conjunction with a rotary oil-type backing pump. Evacuation was continued until no noticeable discharge occurred in the tube when activated by a Tesla coil. The pressure was between $10^{-3}$ and $10^{-4}$ mm. of Hg absolute.

This pressure was held for at least 30 minutes and then the apparatus was isolated from the pumps and the pellet allowed to drop into the heated region of the tube, the reported times in the tables below being measured from this moment.

The gas evolved (99% $CO_2$ by volume) was condensed in the liquid nitrogen trap in order to keep the pressure in the apparatus low. When it was desired to take a volume reading the cold trap was isolated from the heated tube, the condensed gas allowed to warm to room temperature, and the volume of gas at NTP calculated. Occasionally it was found that a gas was evolved (e.g. CO) which did not condense in the nitrogen trap. In such cases, the gas was removed carefully by slow pumping before the trap was warmed to room temperature. The amount of such gas seldom exceeded 1% of the total volume of gas evolved.

Readings were taken periodically up to 6 hours when the degradation was virtually complete. In Example 2, this period was reduced to two hours. In practice the copolymer is unlikely to be exposed to temperatures causing degradation for longer than about ½ hour and the pressure is likely to be at least atmospheric. The test is therefore a severe one.

Volumes of carbon dioxide liberated and reduced viscosities were as follows, the copolymer being a copolymer of maleic anhydride and isobutylene (1:1).

| Temperature °C. (±2° C.) | Volume of gas evolved (ml. at NTP/gm. of copolymer) after— | | | | Reduced viscosity | |
|---|---|---|---|---|---|---|
| | 1 hr. | 2 hrs. | 4 hrs. | 6 hrs. | Initial | Final |
| 260 unstabilised | 19.1 | 29.9 | 48.9 | 54.5 | 0.75 | 0.35 |
| 270 unstabilised | 56.7 | 66.4 | 74.1 | 77.2 | 0.75 | 0.21 |
| 260 (0.5% β-NSA ¹) | 7.8 | 14.9 | 31.1 | 48.8 | 0.75 | 0.40 |
| 260 (0.5% β-NSA ²) | 4.4 | 8.1 | 16.7 | 23.8 | 0.75 | 0.60 |

¹ 0.5% β-naphthalene sulphonic acid was blended into the copolymer by slurrying with ether and evaporating the ether.
² 0.5% β-naphthalene sulphonic acid was blended into the copolymer by slurrying with water and evaporating the water.

EXAMPLE 2

In this example, the copolymer was in isobutylene/maleic anhydride copolymer of reduced viscosity 0.88. The degradation temperature was 270±0.5° C. The results were as follows:

The excellent stability of the compositions containing naphthalene-2,6-disulphonic acid, naphthalene-1,3,6,8-tetrasulphonic acid, the butyl ester of naphthalene-2-sulphonic acid and the dimethyl ester of benzene-1,4-disulphonic acid is particularly noteworthy although with most of the stabilisers the volume of gas evolved in two hours was only about one half of that evolved by the unstabilised sample in ½ hour. Where they were measured, it can be seen that reduced viscosities were also well conserved.

EXAMPLE 3

In this example the isobutylene copolymer of Example 1 was replaced by 1:1 copolymers of 2-methyl butene-1, 2-methyl pentene-1 and styrene with maleic anhydride. The stabiliser in each case was β-naphthalene sulphonic acid, and the degradation temperature was 270±2° C.

| Comonomer | Stabliser percent w./w.¹ | Volume of gas evolved (ml. at NTP/gm. of copolymer) after— | | | | Reduced viscosity | |
|---|---|---|---|---|---|---|---|
| | | 1 hr. | 2 hrs. | 4 hrs. | 6 hrs. | Initial | Final |
| 2-methyl butene-1 | None | 47.0 | 59.6 | 67.3 | 71.8 | 0.81 | 0.25 |
| 2-methyl butene-1 | 0.5 | 4.3 | 11.0 | 22.4 | 33.9 | 0.81 | 0.45 |
| 2-methyl pentene-1 | None | 37.8 | 52.0 | 63.7 | 65.8 | 0.71 | 0.19 |
| 2-methyl pentene-1 | 0.5 | 13.8 | 40.5 | 56.3 | 60.1 | 0.71 | 0.21 |
| Styrene | None | 19.4 | 32.4 | 51.6 | 61.1 | 9.04 | 0.20 |
| Styrene | 0.5 | 6.7 | 14.1 | 19.7 | 22.8 | 0.94 | 0.52 |

¹ Added in presence of water.

The stabilised materials of this example were extruded and injection moulded in a satisfactory manner to give clear, bubble-free shaped articles.

EXAMPLE 4

A copolymer of 50 mole percent maleic anhydride, 40.5 mole percent isobutylene and 9.5 mole percent 2-methyl butene-1, and having a reduced viscosity (measured on a solution of 1 gm. of polymer in 100 mls. of dimethyl formamide at 25° C.) of 0.90, was prepared by polymerising 343 parts of maleic anhydride, 186 parts of isobutylene and 53.8 parts of 2-methyl butene-1 in the presence of 4 parts of benzoyl peroxide in 1280 parts of toluene under nitrogen at 30 lb./sq. inch. The reaction temperature

| Additive 0.5% w./w. added in presence of water* or ether† | Volume of gas evolved (mls. at NTP/gm. of copolymer) after— | | | | | Final reduced viscosity |
|---|---|---|---|---|---|---|
| | ¼ hr. | ½ hr. | ¾ hr. | 1 hr. | 2 hrs. | |
| None | 9.1 | 24.2 | 37.8 | 42.3 | 61.9 | 0.45. |
| Lauryl sulphonic acid† | 2.1 | 5.2 | 8.0 | 12.3 | 28.8 | Not measured. |
| β-Naphthalene sulphonic acid* | 1.3 | 3.4 | 4.9 | 6.4 | 12.3 | 0.62. |
| Benzene 1,3-disulphonic acid* | 1.4 | 3.0 | 4.3 | 5.9 | 12.0 | 0.70. |
| Naphthalene-2,6-disulphonic acid* | 1.2 | 2.5 | 3.1 | 4.1 | 8.0 | Not measured |
| Naphthalene-1,3,6,8-tetrasulphonic acid* | 1.0 | 1.9 | 2.8 | 4.0 | 8.1 | Do. |
| Lauryl sulphonic acid, methyl ester† | 3.2 | 7.9 | 17.6 | 20.5 | 49.6 | Do. |
| Methy sulphonic acid, glyceryl ester† | 2.3 | 4.9 | 7.6 | 11.9 | 27.5 | Do. |
| p-Toluene sulphonic acid, amyl ester† | 2.0 | 3.1 | 5.6 | 8.7 | 32.0 | Do. |
| β-Naphthalene-sulphonic acid, butyl ester† | 1.8 | 2.8 | 3.8 | 4.2 | 7.4 | Do. |
| Phenanthrene-2-sulphonic acid, methyl ester† | 1.3 | 2.2 | 3.6 | 4.5 | 9.4 | Do. |
| Benzene-1,4-disulphonic acid, dimethyl ester† | 1.0 | 2.2 | 3.6 | 5.3 | 10.8 | Do. |
| Diphenyl sulphone-p,p'-disulphonic acid, dimethyl ester† | 1.1 | 2.5 | 3.9 | 5.8 | 13.4 | Do. |
| Diphenyl ether-p,p'-disulphonic acid, dimethyl ester† | 1.8 | 3.6 | 5.2 | 7.2 | 13.8 | Do. |
| 4-nitronaphtho-9,10-sultone† | 1.9 | 5.4 | 13.5 | 23.7 | 47.0 | Do. |
| Triphenylamine salt of naphthalene-2-sulphonic acid (NSA)† | 1.4 | 2.8 | 4.1 | 5.4 | 12.1 | Do. |
| Diphenylamine salt of NSA† | 1.6 | 3.3 | 5.5 | 7.4 | 14.3 | Do. |
| Tridecylamine salt of NSA† | 2.8 | 4.9 | 6.5 | 7.0 | 14.2 | Do. |
| N,N-diphenylacetamide salt of NSA† | 2.1 | 4.6 | 6.5 | 9.5 | 18.7 | Do. |
| Phthalimide salt of NSA† | 1.8 | 2.8 | 4.2 | 5.6 | 13.8 | Do. |
| Triphenylamine salt of lauryl sulphonic acid† | 2.2 | 5.4 | 14.9 | 25.4 | 47.3 | Do. |
| p-Chlorobenzene sulphonic anhydride† | 1.7 | 3.1 | 4.4 | 5.5 | 10.4 | Do. | was initially 75° C. but after 60 minutes it was raised to 90° C. for a further 90 minutes. The resulting slurry was washed, filtered, extracted with ether for 24 hours and dried for 24 hours at 100° C. and an absolute pressure of 15 mm. of Hg followed by 24 hours at 100° C. and an absolute pressure of 0.05 mm. of Hg.

The polymer was divided into a number of portions and to each portion a stabiliser was added in the proportion of 0.5 part/100 parts of polymer by slurrying in diethyl ether and extracting the ether. Each portion was pelletised and tested for thermal decomposition at 270±0.5° C. in the manner described in Example 1. The results were as follows:

| Additive (0.5% w./w.) | Volume of gas evolved (mls. at NTP/-gm. of copolymer) after— | | | | |
|---|---|---|---|---|---|
| | ¼ hr. | ½ hr. | ¾ hr. | 1 hr. | 2 hrs. |
| None | 8.6 | 24.4 | 37.6 | 44.3 | 55.0 |
| NSA | 0.99 | 2.5 | 3.2 | 4.2 | 11.0 |
| NSA butyl ester | 1.87 | 4.1 | 5.6 | 7.8 | 36.2 |
| Lauryl sulphonic acid | 1.63 | 5.3 | 14.2 | 25.6 | 50.3 |
| Lauryl sulphonic acid butyl ester | 2.23 | 6.4 | 15.4 | 20.5 | 48.3 |
| p-Toluene sulphonic acid butyl ester | 1.67 | 3.0 | 7.7 | 17.9 | 51.1 |
| p-toluene sulphonic acid lauryl ester | 0.87 | 2.5 | 5.5 | 13.0 | 44.4 |
| S-benzyl thioronium salt of NSA | 2.0 | 3.8 | 5.8 | 8.0 | 16.6 |

The use of the acid chloride of naphthalene sulphonic acid in place of the acid would give similar results.

EXAMPLE 5

A copolymer of maleic anhydride, isobutylene and propylene, having a reduced viscosity of 0.77 (measured on a solution of 1 gm. of polymer in 100 mls. of dimethyl formamide at 25° C.) was formed by polymerising 440 parts of maleic anhydride, 338 parts of isobutylene and 83.5 parts of propylene in the presence of 4 parts of azodiisobutyronitrile in 2800 parts of toluene under an atmosphere of nitrogen at 30 lb./sq. inch. The reaction was effected for 19 hours at 80° C. and the product was washed, filtered, extracted with ether and dried substantially in the manner described in Example 4. The product was tested in the presence and absence of stabilizer at 270° C. in the manner described in Example 1. The results were as follows:

| Additive (0.5% w./w.) | Volume of gas evolved (mls. at NTP/gm. of copolymer) after— | | | |
|---|---|---|---|---|
| | 1 hr. | 2 hrs. | 3 hrs. | 6 hrs. |
| None | 53.7 | 64.5 | 68.4 | 75.3 |
| NSA | 12.5 | 36.4 | 50.2 | 65.6 |

EXAMPLE 6

A copolymer of 43.5 mole percent maleic anhydride, 50 mole percent isobutylene and 6.5 mole percent maleimide, and having a reduced viscosity of 0.70 (measured on a solution of 1 gm. of polymer in 100 mls. of dimethyl formamide at 25° C.) was formed by polymerising 440 parts of maleic anhydride, 49 parts of maleimide and 420 parts of isobutene in the presence of 5 parts of azodiisobutyronitrile in 2800 parts of toluene at 75° C. for 20 hours. The polymer was tested in the presence and absence of stabilizer at 260° C. in the manner described in Example 1. The results were as follows:

| Additive (0.5% w./w.) | Volume of gas evolved (mls. at NTP/gm. of copolymer) after— | | | |
|---|---|---|---|---|
| | 1 hr. | 2 hrs. | 3 hrs. | 6 hrs. |
| None | 25.7 | 33.7 | 38.4 | 45.5 |
| NSA | 5.0 | 10.8 | 18.9 | 38.3 |

If there is used instead of the copolymer of maleic anhydride, maleimide and isobutene, a copolymer of (a) maleic anhydride, isobutylene and 5 mole percent of 2-methyl pentene-1, (b) maleic anhydride, isobutylene and 5 mole percent of itaconic anhydride, (c) maleic anhydride, isobutylene and 5 mole percent of N-phenyl maleimide, (d) maleic anhyldride, isobutene and 5 mole percent of diethyl fumarate, (e) maleic anhydride, 2-methyl butene-1 and 5 mole percent of propylene, (f) maleic anhydride, 2-methyl pentene-1 and 5 mole percent of methacrylonitrile, (g) maleic anhydride, 2-methyl butene-1 and 5 mole percent of N-p-chlorophenyl maleimide, (h) maleic anhydride, 2-methyl pentene-1 and 5 mole percent of citraconic anhydride or (i) maleic anhydride, 2-methyl pentene-1 and 5 mole percent of di-2-ethylhexyl fumarate, similar results are obtained. In the case of copolymers of maleic anhydride, an alkene such as isobutylene, 2-methyl butene-1 or 2-methyl pentene-1, and a vinyl ether (e.g. vinyl methyl ether) the improvement may be masked to some extent by a tendency for the ether residues to decompose to yield the corresponding alcohol.

EXAMPLE 7

A copolymer of maleic anhydride, isobutylene and 2-methyl butene-1, having a reduced viscosity of 0.73 (measured on a solution of 1 gm. of the polymer in 100 mls of dimethyl formamide at 25° C.) was charged in granular form to a ¾ inch Iddon screw extruder having a die with minimum dead space. The extruder barrel was heated to 250° C. The extrudate was copiously foamed.

The same copolymer was mixed thoroughly with 0.5% of its weight of β-naphthalene sulphonic acid by adding the ingredients to a closed container and tumbling it end-over-end for several hours. The blend was extruded at 250° C. to yield a clear transparent extrudate with very few bubbles. Even after a dwell time of 30 minutes in the extruder, the composition showed a reduced viscosity of 0.68.

EXAMPLE 8

The copolymer of Example 7 was injection moulded in a one ounce pre-plasticising Ankerwerk injection moulding machine at 260° C. and a moulding pressure of 75,000 kg./sq. cm. The mouldings were copiously foamed, especially on the surface.

The same copolymer was blended with 0.5% of its weight of β-naphthalene sulphonic acid in the manner described in Example 7 and the composition was moulded under conditions identical to those used for moulding the copolymer to yield mouldings which were transparent with a slight haze but contained no bubbles.

I claim:
1. A stabilized molding composition comprising (A) 100 parts by weight of a moldable copolymer of 25% to 50% molar of maleic anhydride, at least 25% molar of an alkene of the structure

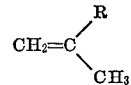

where R is a straight chain alkyl group containing from 2 to 6 carbon atoms, and up to 25% molar of at least one other monoethylenically unsaturated compound, and (B) from 0.01 to 5 parts by weight of a stabilizer comprising at least one compound selected from the group consisting of non-volatile amine-free and hydroxyl-free organic sulphonic acids.

2. A stabilized molding composition comprising (A) 100 parts by weight of a moldable copolymer of maleic anhydride, isobutylene and about 1% molar to about 25% molar of a third comonomer selected from the group consisting of (i) alkenes having a chain of not more than six carbon atoms and having the structure

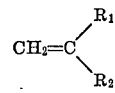

where $R_1$ and $R_2$ are both alkyl groups, at least one of which contains more than one carbon atom, (ii) cyclic anhydrides, imides and N-substituted imides of ethylenically unsaturated dicarboxylic acids containing not more than 6 carbon atoms, other than maleic anhydride, (iii) dialkyl fumarates of the structure

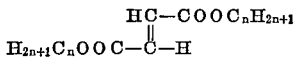

where $n$ is one or four, (iv) ethyl acrylate and (v) propylene; said copolymer containing at least 25% molar of maleic anhydride, at least 25% molar of maleic anhydride, at least 25% molar of isobutylene and not more than 6% molar of propylene, and wherein the melt viscosity of the copolymer is below $10^5$ poises, measured at 250° C. under a constant shear stress of $10^7$ dynes/cm.$^2$, whereby the copolymer may be fabricated at temperatures as low as 230° C. or less on standard equipment, and (B) from 0.01 to 5 parts by weight of a stabilizer comprising at least one compound selected from the group consisting of non-volatile amine-free and hydroxyl-free organic sulphonic acids.

3. A composition according to claim 1 in which the copolymer consists of substantially equimolar proportions of maleic anhydride and an alkene of the structure

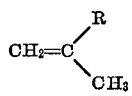

where R is a straight chain alkyl group containing from 2 to 6 carbon atoms.

4. A composition according to claim 1 in which the said other monoethylenically unsaturated monomer is selected from the group consisting of alkenes having a chain of not more than 6 carbon atoms and other than that selected as the second monomer, esters of acrylic acids, dialkyl esters of ethylenically unsaturated dicarboxylic acids and cyclic derivatives of $\alpha,\beta$-ethylenically unsaturated dicarboxylic acids.

5. A shaped article comprising the molding composition of claim 1.

6. A shaped article comprising the molding composition of claim 2.

References Cited
UNITED STATES PATENTS

| | | | |
|---|---|---|---|
| 2,319,954 | 5/1943 | Scott | 260—45.9 |
| 3,138,572 | 6/1964 | Leandri et al. | 260—45.9 |
| 3,215,530 | 11/1965 | Riebel et al. | 260—45.95 |
| 3,236,917 | 2/1966 | Natta et al. | 260—45.95 |
| 3,278,482 | 10/1966 | Leandri et al. | 260—45.9 |
| 3,318,851 | 5/1967 | Nicholls et al. | 260—78.5 |
| 3,297,654 | 1/1967 | Barr et al. | 260—78 |
| 3,108,090 | 10/1963 | Leandri | 260—45.7 |
| 3,297,654 | 1/1967 | Barr et al. | 260—48.5 |
| 3,318,851 | 5/1967 | Nicholls et al. | 260—78.5 |
| 3,198,763 | 8/1965 | Peterli | 260—45.9 |

HOSEA E. TAYLOR, Primary Examiner

U.S. Cl. X.R.

260—41, 45.8, 45.85, 45.9, 45.95